United States Patent [19]

Connor

[11] Patent Number: 4,734,955
[45] Date of Patent: Apr. 5, 1988

[54] HINGE MECHANISM FOR A VEHICLE VISOR

[75] Inventor: John Connor, Warwickshire, Great Britain

[73] Assignee: Incoils Limited, England

[21] Appl. No.: 882,387

[22] Filed: Jul. 7, 1986

[30] Foreign Application Priority Data

Jul. 4, 1985 [GB] United Kingdom ............... 8516896

[51] Int. Cl.$^4$ .............................................. E05C 17/64
[52] U.S. Cl. ................................. 16/332; 16/334; 16/341; 16/342; 296/94 H; 296/97 K
[58] Field of Search ............... 16/223, 332, 334, 341, 16/342, 385; 296/97 B, 97 H, 97 K

[56] References Cited

U.S. PATENT DOCUMENTS

| 2,458,707 | 1/1949 | Jacobs | 296/97 K |
|---|---|---|---|
| 3,000,049 | 9/1961 | Terry, Jr. | 16/334 |
| 3,716,269 | 2/1973 | Herr et al. | 296/97 H |
| 3,872,541 | 3/1975 | Peterson | 16/223 |
| 4,116,514 | 9/1978 | Lawrence | 16/223 X |
| 4,491,899 | 1/1985 | Fleming | 296/97 H X |
| 4,553,797 | 11/1985 | Marcus | 296/97 H X |
| 4,580,829 | 4/1986 | Matheopoulos | 16/334 X |

FOREIGN PATENT DOCUMENTS

| 2432585 | 1/1976 | Fed. Rep. of Germany. | |
|---|---|---|---|
| 1123335 | 9/1956 | France | 296/97 H |
| 80346 | 4/1963 | France | 296/97 H |
| 2491403 | 10/1980 | France. | |
| 0053529 | 6/1982 | France. | |
| 1395689 | 5/1975 | United Kingdom. | |
| 1422368 | 1/1976 | United Kingdom. | |
| 1534282 | 11/1978 | United Kingdom. | |
| 1560723 | 2/1980 | United Kingdom | 16/334 |
| 2088299 | 6/1982 | United Kingdom | 296/97 H |

Primary Examiner—Fred Silverberg
Attorney, Agent, or Firm—Parkhurst & Oliff

[57] ABSTRACT

A hinge mechanism including a sleeve member having an inwardly facing bearing surface and a rod member dimensioned to fit in the sleeve member in engagement with the bearing surface. The sleeve member is resiliently flexible but substantially inextensible and has at least one recess formed in its bearing surface, the rod member being provided with a projection shaped to be engageable in the recess. The rod member is an interference fit in the sleeve member with the projection located in the recess and the rod member is rotatable in the sleeve member by causing only resilient deformation of the latter.

16 Claims, 1 Drawing Sheet

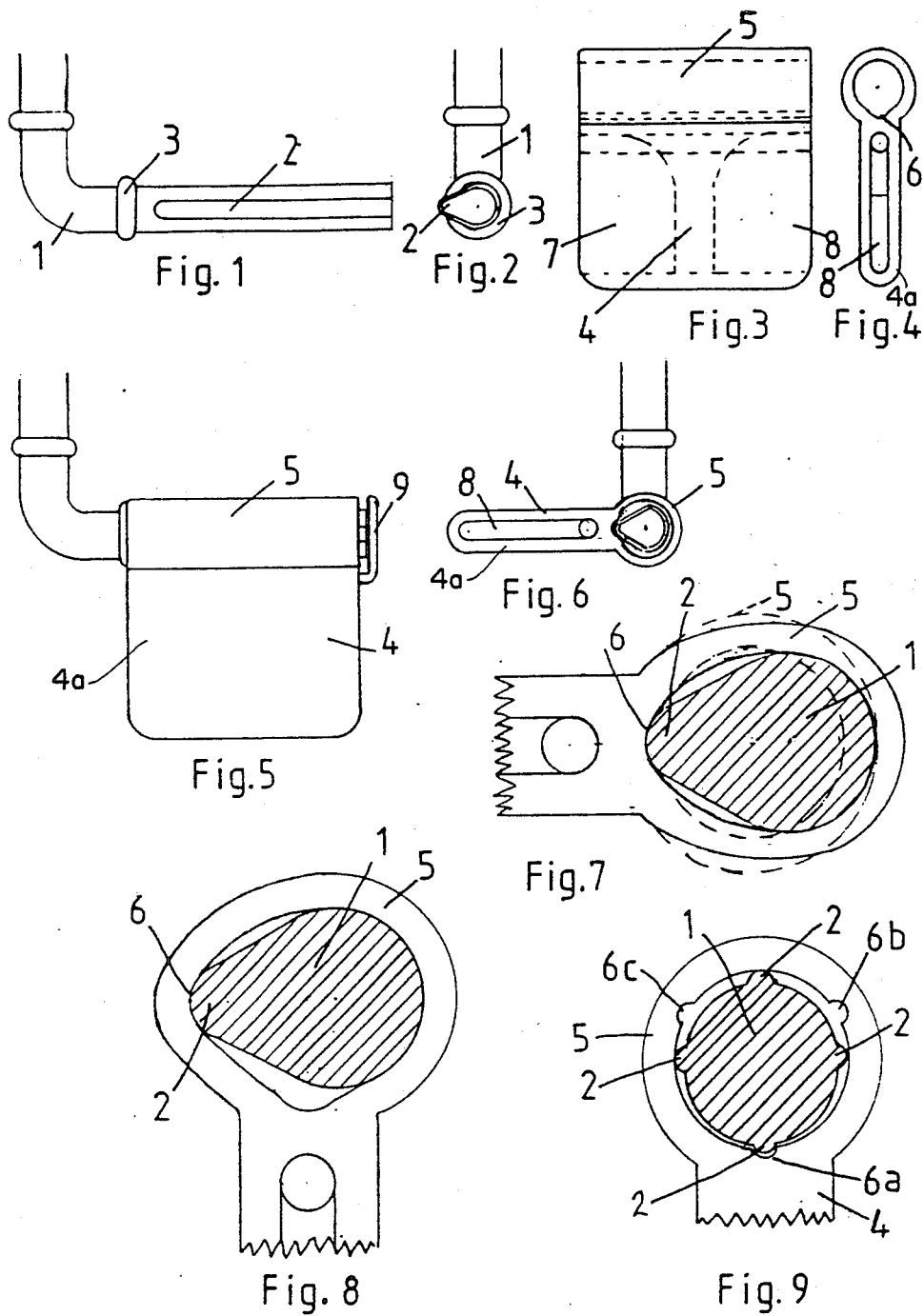

HINGE MECHANISM FOR A VEHICLE VISOR

BACKGROUND OF THE INVENTION

This invention relates to a hinge mechanism suitable for supporting a vehicle mounted sun visor. Sun visors for vehicles are usually provided with a support arm extending from the vehicle structure and various means have been proposed in the past for attaching the visor to the support arm in such a way that it is frictionally held so that it can be held in a stored postion, sometimes with a detent operative at this stored position, for movement to any one of a number of positions where it is effective to shade the eyes of the vehicle driver or passenger from sunlight.

Previously employed designs for such hinge mechanisms have included a sleeve member engaged upon a rod member with the required friction provided by a spring clip engaged around the sleeve member. Often a portion of the spring clip is formed to extend through the sleeve and engage the rod member, which is manufactured with a "flat" portion on its surface, to provide a detent at the sun visor's stored position. Examples of this type of hinge mechanism are disclosed in British Pat. No. 1 534 282 and published European Patent Application No. 0 053 529.

These known hinge designs suffer from two distinct disadvantages: firstly the hinge mechanisms require the manufacture and assembly of at least three, sometimes complex, components at a commensurately high cost, and secondly the finished hinges are prone to rattle as a result of the number of components employed and the necessity to form some of the components from metal.

In order to overcome the problems inherent in the aforementioned type of hinge mechanism, simplified two-piece sleeve and rod designs have been proposed, in which at least one of the components is formed from a resilient plastics material.

Examples of this latter type of hinge mechanism are proposed in British Pat. Nos. 1 395 689 and 1 422 368. The design proposed in GB No. 1 395 689 comprises a shaft or rod member formed with a flattened portion, and a sleeve or bearing member having a complementary non-circular cross section to provide a detent position for an associated sun visor. This design suffers from the disadvantages set out in GB No. 1 422 368. These may be summarised as follows: if the bearing material is made soft enough to allow the visor to be hinged without damage to its structure, the bearing becomes permanently stretched and distorted by use and thus no longer functions to provide the required friction or detent position.

The design proposed in GB No. 1 422 368 was intended to overcome the problems of the earlier two-piece design by incorporating a gap in the sleeve or bearing member of the hinge described in GB No. 1 395 689. However in use the plastics forming the sleeve or bearing member tend to flow under load and the gap opens up, thereby reducing the grip of the sleeve or bearing member upon the rod to below an acceptable level. Furthermore, the corner formed where the flat portion meets the curved portion of the rod catches in the gap as the rod is rotated, pulling the gap apart and thereby exacerbating the gap's tendency to open in use.

Both the aforementioned hinge designs employ a flexible sleeve member. In West German Pat. No. 2 432 585 a hinge is proposed having a rigid non-circular sleeve and a resilient rod member confined therein. A disadvantage of this form of hinge mechanism is that, in order to provide the required friction and detent the rod is shaped to flex as it is rotated in such a way that the same part of its structure is repeatedly stressed in the same direction throughout its working life. This leads to a weakening of the rod's resilience in use (due to material flow when the rod is formed from plastics materials) and hence a degradation in the hinge's performance. Indeed, this deficiency was recognised by the authors of DE No. 2 432 585 since, in one embodiment, they show the reinforcement of the rod by a separate, metal spring member.

SUMMARY OF THE INVENTION

In a first aspect of the present invention the Inventor has sought to overcome the above summarised disadvantages of of prior art, in a hinge mechanism comprising a sleeve member defining an inwardly facing bearing surface and a rod member dimensioned to fit in the sleeve memeber in engagement with the bearing surface, by providing a hinge mechanism in which the sleeve member is resiliently flexible but substantially inextensible, at least one recess is formed in the bearing surface, the rod member is provided with a projection shaped to be engageable in the recess and is an interference fit in the sleeve member with the projection located in the recess, the rod member being rotatable in the sleeve member by causing only resilient deformation of the latter. By the term "an interference fit" it is meant that when the sleeve and rod members are assembled, a slight resilient distortion of the sleeve member occurs.

Advantages of the hinge mechanism of the present invention include the following:

The hinge mechanism only comprises two components, at least one of which, the sleeve, may be readily formed from plastics materials by injection moulding techniques; the hinge is totally rattle proof in use and; the grip of the sleeve upon the rod does not degrade with use. This last advantage is considered to be derived from the fact that in the present invention the material forming the sleeve is not stretched in any way as the rod is rotated, it is merely distorted, and that, as the rod is rotated, so is the profile into which the sleeve is distorted; ie: the manner in which the sleeve is distorted moves and the sleeve is not stressed in the same direction or manner at all times, as in previous designs.

In an embodiment the recess is in the form of a longitudinal groove of rounded cross-section and the rod is substantially cylindrical with the projection provided by an elongate cam-lobe shaped to be engageable in the longitudinal groove to provide a detent position. The bearing surface has a generally cylindrical form when the sleeve member is relaxed. The rod has a larger radius portion having a radius greater than the radius of the cam lobe and less than the radius of the relaxed bearing surface, which larger radius portion extends over a length of arc sufficient to span the groove in a circumferential direction. Since the sleeve is a complete cylinder, where ever the rod may be in the sleeve there are always forces acting to restore a distorted portion of the sleeve to the original generally cylindrical form. An advantage of this embodiment is that the forces exerted upon the cam lobe by the sleeve are exerted along its entire length, and the tendency of either component of the hinge to wear is reduced. Furthermore if the hinge is left in a position where the cam-lobe is not in the groove, the tendency for the lobe to leave a permanent indentation in the bearing surface is minimised. This results both from the length of the cam-lobe and the fact that any such indentation is stretched out when the lobe is rotated away from it.

In a preferred form of the aforementioned embodiment of the invention, the rod has only one elongate cam-lobe. In this embodiment the small radius of the cam-lobe is held in the groove by the pressure exerted on the large radius portion of the rod by the bearing surface of the sleeve member, which is distorted by virture of the two components having an interference fit. Furthermore the choice of radii for the various components and the length of arc of the larger radius component of the rod allows the rod to rotate smoothly within the sleeve while without giving any detent action except when the cam-lobe falls into the groove.

In further embodiments the sleeve member is reinforced in the vicinity of the groove and this reinforcement may be provided by a lug extending from the sleeve, which lug is adapted to engage a first component to be hinged, possibly a sun visor, the rod being provided with means for engaging a second component to be hinged, for example a vehicle body. An advantage of these embodiments is that the reinforcement provides a more positive detent action.

In a yet further embodiment the rod is provided with a plurality of elongate cam-lobes arranged around its periphery and the sleeve member is provided with a plurality of recesses in the bearing surface thereof, the number of recesses being different to the number of cam-lobes. For example, there may be four equally spaced cam-lobes on the rod and three equally spaced recesses in the bearing surface. This will then provide a detent position every 30° of rotation.

Hinge mechanisms in accordance with the present invention are especially suitable to having their sleeve member formed from a plastics material of the kind generally referred to as "engineering plastics", such acetals, polycarbonates, PBT or nylon. Such plastic does not stretch appreciably, unless overloaded, however it is readily resiliently distorted. Thus a sleeve member of the present invention will be distorted by the rotation of a rod member therein, however it will maintain the same peripheral or circumferential length and thus put considerable pressure on the support arm.

In another aspect, the present invention provides a vehicle sun visor including a hinge mechanism in accordance with the first aspect of the present invention. In an embodiment the body of such a sun visor is engaged with a lug extending from the sleeve and the rod member is provided with means for engagement with a vehicle body. In another embodiment, the sun visor incorporates a flap for covering or carrying a mirror, which flap is hinged to the visor body by a hinge in accordance with the first aspect of this invention.

BRIEF DESCRIPTION OF THE DRAWINGS

The invention will now be described in relation to the accompanying drawings in which:

FIG. 1 is a front elevation of a support arm,

FIG. 2 is an end elevation of the same,

FIG. 3 is an elevation of a sleeve member, adapted to form part of a sun visor,

FIG. 4 is an end elevation of the same,

FIG. 5 is a front elevation of the part of FIGS. 1 to 4 when assembled together, FIG. 6 is an end elevation of the same, FIG. 7 a section on an enlarged scale showing the hinge components of the previous Figures when in the detent or stored position, FIG. 8 is a similar view when the detent is in the frictional hold position, and FIG. 9 is a similar view to FIG. 7 of a further form of hinge providing multiple detent positions.

Referring first to FIGS. 1 to 6 a support arm 1 comprises a generally L-shaped arm of circular cross section, the top end of which is for support from the roof of a vehicle by a swivel or ball joint (not shown). The horizontal portion of the arm 1 is provided with an elongated projection 2 which has the general form of a cam-lobe, as shown in FIG. 2. A stop shoulder 3 is also provided. The other part of the hinge comprises a plastic moulding 4, as shown in FIGS. 3 and 4, and this has an upper part in the form of a tubular bearing sleeve 5 which has a recess 6 arranged to mate with the projection of the arm 1. The remaining flat part of the moulding 4 is in the form of a rectangular cross-sectioned lug or web 4a and has a pair of internal recesses 7 and 8 into which are inserted the respective ends of a wire frame which forms part of and supports the visor from the moulding 4. These wire ends are bent to fit around the curved portions of the recesses shown in dashed lines in FIG. 3. The wires may be held in position in the lug 4a by staking or by insertion of plugs or by hot pressing of the material of the moulding, if it is a thermoplastic material.

The moulding 4, together with the visor (not shown) is assembled on to the support arm and its projection 2, the sizing of the sleeve portion being such that the moulding 4 can be assembled on to the arm by a push or interference fit. Since the arm 1 will ordinarily be of metal, maybe tubular in order to provide a passage for electrical conductors to power a lamp for a vanity mirror in the visor, a tab 9 may form part of the moulding 4 arranged so as to cover the end of the arm 1 to comply with safety regulations. Once the sleeve 5 has been pushed on to the arm 1 it is held in position by small projections (not shown) on the end of the arm.

The fit and operation of the hinge is shown in more detail in FIGS. 7 and 8 where the arm 1, shown in this case for clarity as a solid rod, has its projection in the form of a cam-lobe. The sleeve 5 is shown in its initial relaxed condition in dashed lines, from which it will be observed that its internal profile is circular but with a recess 6 corresponding in shape to the tip of the cam-lobe. The sleeve 5 is an interference fit on the arm 1 and this is shown in exaggerated form so that it can be seen that when assembled the inner profile of the sleeve 5 becomes distorted so as to conform to the circular portion of the arm 1 and the sleeve as a whole is constrained to adopt a somewhat oval configuration. There is thus a considerable pressure developed between the contacting portions of the sleeve and the arm, so that the recessed part 6 is held firmly in contact with the lobe 2. This is arranged to correspond to the stored position of the visor in which it lies against the head lining of the vehicle.

When it is desired to move the visor into a different position force is applied to it sufficient to overcome the reluctance of the tip of the lobe 2 to leave the recess 6. In doing this the sleeve 5 is obliged to take up a position where its wall portions, where they are not in contact with the surface of the arm 1, tend to assume the shape of a chord, and thus increase the pressure between the mating surfaces. This maintains a good frictional contact between the mating surfaces and enables the visor to stay in any position in which it is set. Such a position is shown in FIG. 8.

A further form of the invention is shown in FIG. 9, which corresponds in general terms to FIG. 8 of the first form of the invention. In FIG. 9 the arm 1 is in the form of a circular cross-section body having a number of projecting lobes 2 around its periphery. A moulding 4 again forms a support for frame wires forming a basis for the visor body (not shown) and has a generally circular profile sleeve 5 and this has a number of recesses, one of which is shown at 6a. The arrangement is such that, taking into account the extent to which all the projections 2 are raised from the surface of the arm 1, the inner profile of the sleeve 5 forms an interference fit with the arm 1 having one of the projections 2 in engagement with the recesses 6a. Further recesses 6b and 6c are provided at positions that do not coincide with any of the projections 2 while one of them is engaged with the recess 6a. They are however, equidistantly spaced and in this particular case there are four projections 2 and three recesses. It will be seen, therefore, that a number of detent positions is provided as the moulding 4 is rotated so as to being the projections 6b and 6c in turn into correspondence with successive projections 2. The arrangement of four projections and three recesses provides detent positions at 30° in the rotation of the sleeve 5 with respect to the arm 1. Other combinations of number of recesses and projections may be used to provide a larger or smaller number of positions.

If desired, in the arrangement shown in FIGS. 1 to 8 one or more additional detent positions can be provide either by having extra lobes or extra recesses, or both. For example, an additional recess could be can be provided at approximately 180° so as to provide locked position for the visor both in its stored position and in the position where it is virtually flat against the windscreen.

Similarly, an extra detent position could be arranged in the example shown in FIG. 9 by having an extra recess opposite the one in which the lobe 6a is located.

I claim:

1. A hinge mechanism comprising a sleeve member defining an inwardly facing bearing surface and a rod member dimensioned to fit in the sleeve member in direct engagement with the bearing surface wherein: the sleeve member is resiliently flexible but substantially inextensible, at least one recess is formed in the bearing surface, the rod member is provided with a projection shaped to be engageable in the recess; said rod member being an interference fit in and in direct engagement with the sleeve member with the projection located in the recess, and rotatable in the sleeve member by causing only resilient deformation of the latter; and the shape into which the sleeve member is distorted varies when said sleeve member is rotated with respect to said rod member from any first position to any second position to thereby positively distort different areas of the sleeve member while previously distorted areas of the sleeve member return to a substantially undistorted condition as the sleeve member is rotated from any first position to any second position.

2. A hinge mechanism as claimed in claim 1 wherein, the recess is in the form of a longitudinal groove of rounded cross-section and the rod is substantially cylindrical, with the projection provided by an elongate cam-lobe extending outwardly from the rod and shaped to be engageable in the longitudinal groove, to provide a detent position.

3. A hinge mechanism as claimed in claim 2 wherein the bearing surface is generally cylindrical when the sleeve member is relaxed, the rod has a larger radius portion having a radius greater than the radius of an arc upon which the tip of the cam-lobe is defined and less than the radius of the relaxed bearing surface, said portion extends over a length of arc sufficient to span the groove in a circumferential direction.

4. A hinge mechanism as claimed in claim 3 wherein the sleeve is reinforced in the vicinity of the groove.

5. A hinge mechanism as claimed in claim 4 wherein in that the reinforcement is provided by a lug extending from the sleeve, said lug is adapted to engage a first component to be hinged and, the rod is provided with means for engaging a second component to be hinged.

6. A hinge mechanism as claimed in claim 2 wherein a plurality of longitudinal grooves are formed in the bearing surface of the sleeve.

7. A hinge mechanism as claimed in claim 2 wherein, the rod is provided with a plurality of elongated cam-lobes arranged around its periphery and the sleeve member is provided with a plurality of recesses in the bearing surface thereof, the number of recesses being different to the number of cam-lobes.

8. A hinge mechanism as claimed in claim 7 wherein, the recesses and cam-lobes are respectively equidistantly spaced around the rod member and sleeve member.

9. A hinge mechanism as claimed in claim 1 wherein, the sleeve member is formed from an engineering plastics material.

10. A vehicle sun visor including a hinge mechanism comprising a sleeve member defining an inwardly facing bearing surface and a rod member dimensioned to fit in the sleeve member in direct engagement with the bearing surface wherein; the sleeve member is resiliently flexible but substantially inextensible, at least one recess is formed in the bearing surface, the rod member is provided with a projection shaped to be enagageable in the recess; said rod member being an interference fit in and in direct engagement with the sleeve member with the projection located in the recess, and rotatable in the sleeve member by causing only resilient deformation of the latter; and the shape into which the sleeve member is distorted varies when said sleeve member is rotated with respect to said rod member from any first position to any second position to thereby positively distort different areas of the sleeve member while previously distorted areas of the sleeve member return to a substantially undistorted condition as the sleeve member is rotated from any first position to any second position.

11. A vehicle sun visor as claimed in claim 10 wherein the recess is in the form of a longitudinal groove of rounded cross-section and the rod is substantially cylindrical, with the projection provided by an elongate cam-lobe shaped to be engageable in the longitudinal groove, to provide a detent position.

12. A vehicle sun visor as claimed in claim 11 wherein the bearing surface is generally cylindrical when the sleeve member is relaxed, the rod has a larger radius portion having a radius greater than the radius of an arc upon which the tip of the cam-lobe is defined and less than the radius of the relaxed bearing surface, said portion extends over a length of arc sufficient to span the groove in a circumferential direction.

13. A vehicle sun visor as claimed in claim 12 wherein a reinforcing lug extends from the sleeve, the body of the visor is engaged with the lug and the rod is provided with means for engagement with the vehicle body.

14. A vehicle sun visor as claimed in claim 13 wherein the lug is provided with recesses for engaging and holding the ends of a wire frame of the visor.

15. A vehicle sun visor as claimed in claim 13 wherein the sleeve includes an integral tab for covering the end of the rod member.

16. A vehicle sun visor as claimed in claim 13 wherein the lug includes an integral tab for covering the end of the rod member.

* * * * *